No. 636,758. Patented Nov. 14, 1899.
W. L. CASADAY.
FLEXIBLE SHAFT.
(Application filed May 26, 1899.)
(No Model.)
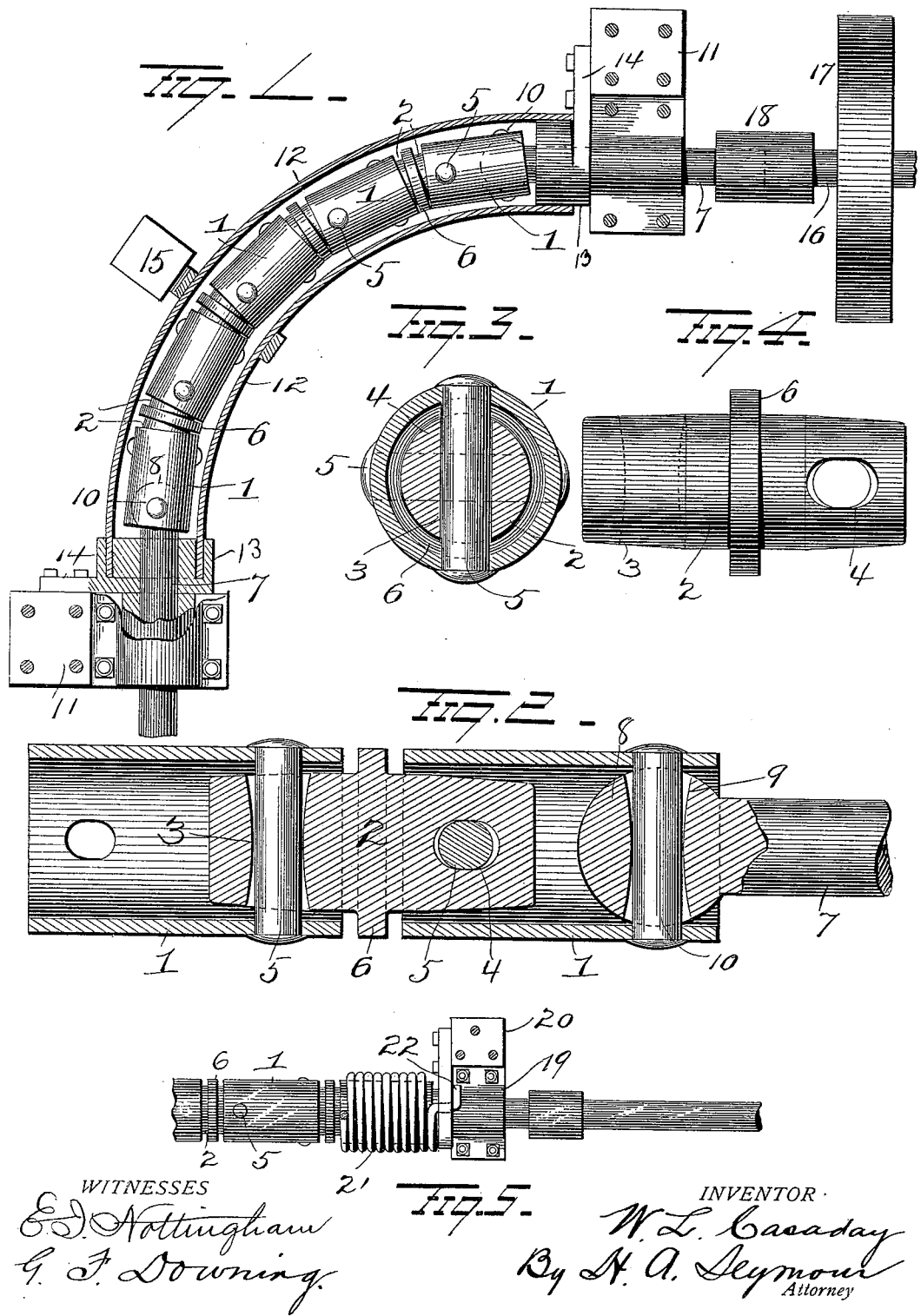
WITNESSES
E. J. Nottingham
G. F. Downing
INVENTOR
W. L. Casaday
By H. A. Seymour
Attorney

UNITED STATES PATENT OFFICE.

WILLIAM L. CASADAY, OF SOUTH BEND, INDIANA.

FLEXIBLE SHAFT.

SPECIFICATION forming part of Letters Patent No. 636,758, dated November 14, 1899.

Application filed May 26, 1899. Serial No. 718,440. (No model.)

*To all whom it may concern:*

Be it known that I, WILLIAM L. CASADAY, a resident of South Bend, in the county of St. Joseph and State of Indiana, have invented certain new and useful Improvements in Flexible Shafts; and I do hereby declare the following to be a full, clear, and exact description of the invention, such as will enable others skilled in the art to which it appertains to make and use the same.

My invention relates to an improvement in flexible shafts, the object of the invention being to provide a flexible shaft which will be simple in construction, cheap to manufacture, strong and durable, and most effectual when in use.

With these objects in view the invention consists in certain novel features of construction and combinations and arrangements of parts, as will be more fully hereinafter described, and pointed out in the claims.

In the accompanying drawings, Figure 1 is a view illustrating my improvements. Figs. 2, 3, and 4 are detail views, and Fig. 5 is a view of a modified form of my invention.

My improved flexible shaft comprises a series of tubular sections 1, connected together by a series of links or castings 2. The links or castings 2 are beveled or contracted on their ends and provided in one end with a vertical hole or opening 3 and in the other end with a horizontal hole or opening 4 for the reception of pins 5, passing through diametrically opposite holes or openings in the tubular sections 1. The ends of the holes or openings 3 and 4 in the links or castings are made elongated, as shown, to permit of a certain movement of the pin in the opening, and the links or castings are each provided centrally with a peripheral flange or ring 6, which is disposed a slight distance from the end of each tubular section 1 and is adapted when the shaft is bent to receive the ends of the tubular sections and prevent gripping of the shaft-casing. The end tubular sections are connected with shafts 7, each having an enlargement 8 on its inner end, which is provided with an elongated hole or opening 9 for the passage of the pin 10, passing through alined holes or openings in the end tubular sections.

The shafts 7 are supported in suitable brackets 11, secured to the ceiling or other support, and the flexible shaft is disposed in a tube or pipe 12 somewhat larger in diameter than the shaft to permit the latter to turn freely therein. The tube or pipe 12 is supported at its ends in sleeves 13, having ears 14 thereon, which are secured to the brackets 11, as shown. The tube or pipe 12 may also be supported centrally by a bracket 15. The tube or pipe 12 is adapted to contain a quantity of lubricant to lubricate the flexible shaft at all times.

The ends of the shafts 7 are connected with line-shafting 16, having pulleys 17 thereon, by means of any approved coupling 18, as shown.

Instead of mounting my improved flexible shaft as above described I might mount the same as shown in Fig. 5. In this form of my invention the shaft 7 is supported in a bearing 19 in a suitable bracket 20, and a spring-wire 21 is loosely coiled around my improved shaft and is bent at one end, as shown at 22, and passed through a hole in the bracket 20 to secure the spring-wire against turning with the shaft.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. A flexible shaft consisting of a series of cylindrical members spaced apart, intermediate members disposed between and entering the ends of the cylindrical members, each intermediate member made in the form of two truncated cones and having holes near its ends, said holes having elongated ends and pins passing through said holes and the cylindrical members.

2. A flexible shaft comprising a series of cylindrical sections and alternating links projecting into and pivotally connecting said cylindrical sections, the holes in the links through which the pivot-pins pass being elongated at the ends.

3. A flexible shaft comprising a series of cylindrical sections and alternating links projecting into and connecting said cylindrical sections, a central annular flange on each link and each link being made beveled or tapering from said annular flange to its ends, the beveled or tapering portions of each link having holes elongated at the ends for the passage of the pivot-pins.

In testimony whereof I have signed this specification in the presence of two subscribing witnesses.

WILLIAM L. CASADAY.

Witnesses:
JOHN CROSS,
ADOLPH S. GINZ.